US011039290B2

(12) United States Patent
Baer

(10) Patent No.: US 11,039,290 B2
(45) Date of Patent: Jun. 15, 2021

(54) METHODS AND APPARATUSES FOR PROVIDING A SERVICE HAVING A SERVICE PROFILE

(71) Applicant: Telia Company AB, Solna (SE)

(72) Inventor: Anders Baer, Årsta (SE)

(73) Assignee: Telia Company AB, Solna (SE)

( * ) Notice: Subject to any disclaimer, the term of this patent is extended or adjusted under 35 U.S.C. 154(b) by 110 days.

(21) Appl. No.: 16/427,688

(22) Filed: May 31, 2019

(65) Prior Publication Data

US 2019/0373428 A1   Dec. 5, 2019

(30) Foreign Application Priority Data

Jun. 1, 2018   (SE) .................................. 1850664-2

(51) Int. Cl.
*H04W 4/50* (2018.01)
*H04L 12/24* (2006.01)
*H04W 48/06* (2009.01)
*H04W 48/20* (2009.01)

(52) U.S. Cl.
CPC ........... *H04W 4/50* (2018.02); *H04L 41/0816* (2013.01); *H04L 41/0896* (2013.01); *H04W 48/06* (2013.01); *H04W 48/20* (2013.01)

(58) Field of Classification Search
CPC ....... H04W 4/50; H04W 48/06; H04W 48/20; H04W 28/26; H04W 72/0406; H04L 41/0816; H04L 41/0896; H04L 41/0806; H04L 41/5051; H04L 65/1069; H04L 65/80; H04L 67/38; H04L 41/5054;
(Continued)

(56) References Cited

U.S. PATENT DOCUMENTS

| 6,427,174 B1 | 7/2002 | Sitaraman et al. |
| 9,983,860 B1 * | 5/2018 | Koty ................. H04L 67/10 |
| 10,275,416 B1 * | 4/2019 | Felbinger ........... G06Q 30/0282 |

(Continued)

FOREIGN PATENT DOCUMENTS

WO   WO 2017/123277 A1   7/2017

OTHER PUBLICATIONS

Extended Search Report, Application No. 19176457.0-1213, dated Sep. 26, 2019, European Patent Office, Munich Germany.

(Continued)

*Primary Examiner* — Jay P Patel
(74) *Attorney, Agent, or Firm* — Burr & Forman LLP; Jeffrey H. Kamenetsky

(57) ABSTRACT

The embodiments herein relate to methods and apparatuses for adopting network conditions for providing cloud based applications or services to a user. A method performed by a network node of a network operator includes: receiving, from a server of a service provider, a service profile for a service selected by a user of a UE that is connected to the network operator; configuring network conditions, in terms of at least bandwidth or throughput, and latency, based on the received service profile; requesting a selected access point, to adapt its network conditions in accordance with the configured network conditions; and if the selected access point successfully adapts its network conditions, sending a confirmation to the server of the service provider confirming that the requirements of the service in accordance with the service profile, are met.

18 Claims, 10 Drawing Sheets

(58) Field of Classification Search
CPC ...... H04L 47/805; A63F 13/77; A63F 13/335; A63F 13/355; A63F 13/358
See application file for complete search history.

(56) References Cited

U.S. PATENT DOCUMENTS

| | | | | |
|---|---|---|---|---|
| 10,334,517 | B2* | 6/2019 | Wakabayashi | H04W 48/18 |
| 10,355,989 | B1* | 7/2019 | Panchal | H04L 12/467 |
| 10,523,631 | B1* | 12/2019 | Wagner | H04L 45/64 |
| 10,742,721 | B1* | 8/2020 | Wagner | H04L 12/4641 |
| 2009/0313358 | A1 | 12/2009 | Shepherd et al. | |
| 2010/0195503 | A1 | 8/2010 | Raleigh | |
| 2010/0278158 | A1* | 11/2010 | Lee | H04W 48/20 370/338 |
| 2015/0209662 | A1* | 7/2015 | Vukojevic | A63F 13/335 463/42 |
| 2015/0326441 | A1* | 11/2015 | Smith | H04L 12/6418 370/255 |
| 2016/0112944 | A1* | 4/2016 | Zhou | H04W 36/0072 370/338 |
| 2016/0301779 | A1 | 10/2016 | Cui et al. | |
| 2016/0308762 | A1* | 10/2016 | Teng | H04L 12/4641 |
| 2017/0041106 | A1 | 2/2017 | Srivastava et al. | |
| 2017/0181038 | A1 | 6/2017 | Yeddala et al. | |
| 2017/0189809 | A1* | 7/2017 | Posin | A63F 13/35 |
| 2017/0304727 | A1* | 10/2017 | Gallizzi | A63F 13/493 |
| 2017/0354878 | A1* | 12/2017 | Posin | A63F 13/355 |
| 2018/0310243 | A1* | 10/2018 | Yoshino | H04W 48/20 |
| 2018/0332524 | A1* | 11/2018 | Rasanen | H04W 36/0083 |
| 2019/0321732 | A1* | 10/2019 | Zimring | A63F 13/355 |

OTHER PUBLICATIONS

Search Report, Application No. 1850664-2, dated Jan. 21, 2019, Swedish Patent and Registration Office, Stockholm, Sweden.

* cited by examiner

METHODS AND APPARATUSES FOR PROVIDING A SERVICE HAVING A SERVICE PROFILE

TECHNICAL FIELD

The present disclosure relates to the field of data communications, and in particular to adopting network conditions for providing cloud based applications or services to a user.

BACKGROUND

Applications and services that require a lot of network resources, and in particular those involving "real-time" applications such as gaming, usually require high-tech hardware resources. The hardware is usually quite costly and needs to be upgraded every now and then when new games, requiring high performance of hardware, are introduced to the market. With the expansion of high-internet connectivity to the greater population, game streaming using cloud systems has increased.

Cloud systems deliver services over a network (typically the Internet) using computing resources (hardware and software). The services or applications, e.g., gaming, enable streaming of content to remote clients or user equipments (UEs), wherein most processing is done on servers, which may be distributed. Input provided at the remote clients or UEs will in turn drive execution of the service/game on the servers, without the need for dedicated gaming hardware at the client's location. Due to the ease of accessing the games executing on the cloud systems, cloud gaming has been increasing in popularity because users find it easier to access more titles without complex hardware restrictions. Similarly, game suppliers find it easier to manage game code from centralized locations.

Recently, NVIDIA, a company focusing on developing Graphics Processing Units (GPU) released its cloud gaming service "GeForce Now" that allows users play the latest games on old Personal Computers (PCs) or Macintosh (MAC) computers. This is achieved by placing the games in a GPU cluster in the cloud and streaming the games to the remote clients.

Unfortunately, service providers that offer cloud gaming cannot guarantee that the specifications or requirements of the games (which may vary) can be maintained during the playing of the game. As an example, "GeForce Now" game requires a 25 Mbps download speed for 1080p at 60 fps (frames per second), but 50 Mbps or higher is recommended. In addition, a hardwired Ethernet connection or a 5 GHz wireless router is needed.

Congestion typically occurs in one of three primary areas: the last mile near the user, the middle or Internet cloud, and the last mile on the server side of the service provider. This means that the user needs to check his/her Internet connection to see if the service can be delivered. As an example, a user may be requested to upgrade download speed, limit other network traffic in the user's environment, such as video streaming, downloading large files or uploading files; move closer to the router, turn off any VPNs (Virtual Private Networks) that are used, turn off QoS (Quality-of-Service), switch to a wired connection, turn off network firewalls, etc. These tasks are cumbersome for the user and also security of the network may be compromised.

In addition, since the service of cloud gaming is heavily dependent on the latency to not cause buffering or "lag" (a phenomenon where the number frames per second goes down and causes reduction in feedback from the service provider or from the user, either graphic processing or control), it is necessary that the preferences can be kept on a constant level.

Today, Over-The-Top (OTT) which is a media distribution practice that allows a streaming content provider to sell audio, video and other media services directly to the user over the internet via streaming media, usually work adequately provided the network conditions are robust. This however is not always the case and for real-time applications there is no room for not having enough network capacity during use of the service, otherwise the service cannot be used.

SUMMARY

It is an object of embodiments herein to solve the above problems by providing methods, apparatuses and computer program product for improving user experience by configuring network conditions based on service profile of a cloud based service or application (e.g. a game) and adopting network conditions accordingly.

According to an aspect of embodiments herein, there is provided a method performed by a network node of a network operator, the method comprising: receiving, from a sever of a service provider, a service profile for a service selected by a user of a user equipment, UE, that is connected to the network operator; configuring network conditions, in terms of at least bandwidth, latency, throughput, based on the received service profile; sending a request to an access point selected by the network operator, to adapt its network conditions in accordance with the configured network conditions; and if the selected access point successfully adapts its network conditions, sending a confirmation to the server of the service provider confirming that the requirements of the service in accordance with the service profile, are met.

According to another aspect of embodiments herein there is provided a method performed by a server of a service provided, the method comprising: transmitting, to a network node of a network operator, a service profile for a service selected by a user of a user equipment, UE, that is connected to the network operator; receiving a confirmation, from the network node of the network operator, confirming that the requirements of the service in accordance with the service profile, are met, if an access point selected by the network operator successfully adapts its network conditions in terms of at least bandwidth, latency, throughput, based on the transmitted service profile.

According to another aspect of embodiments herein, there is provided a network node of a network operator, the network node comprising a processor and a memory containing instructions executable by the processor, wherein the network node is operative to:
receive, from a server of a service provider, a service profile for a service selected by a user of a user equipment, UE, that is connected to the network operator; configure network conditions, in terms of at least bandwidth, latency, throughput, based on the received service profile; send a request to an access point selected by the network operator to adapt its network conditions in accordance with the configured network conditions; and if the selected access point successfully adapts its network conditions, send a confirmation to the server of the service provider confirming that the requirements of the service in accordance with the service profile, are met.

According to another aspect of embodiments herein, there is provided a server of a service provider comprising a processor and a memory containing instructions executable by the processor, wherein the server is operative to: transmit, to a network node of an operator, a service profile for a service selected by a user of a user equipment, UE, that is connected to the network operator; receive a confirmation, from the network node of the network operator, confirming that the requirements of the service in accordance with the service profile, are met, if an access point selected by the network operator successfully adapts its network conditions in terms of at least bandwidth or throughput, and latency, based on the transmitted service profile.

An advantage with embodiments herein is to improve the user experience by adopting network conditions, between the user and the service provider, in dependence of the profile of the service selected by the user.

Another advantage with embodiments herein is that by introducing an information flow between a user—a service provider—network operator(s), the end user service can go from being best effort to on-demand access agnostic and network supported.

Additional advantages are achieved by the present embodiments which will become apparent from the following detailed description when considered in conjunction with the accompanying drawings.

BRIEF DESCRIPTION OF THE DRAWINGS

Example of embodiments herein are described in more detail with reference to attached drawings in which.

DETAILED DESCRIPTION

In the following, a detailed description of the exemplary embodiments is presented in conjunction with the drawings to enable easier understanding of the solutions(s) described herein.

Figure 1:
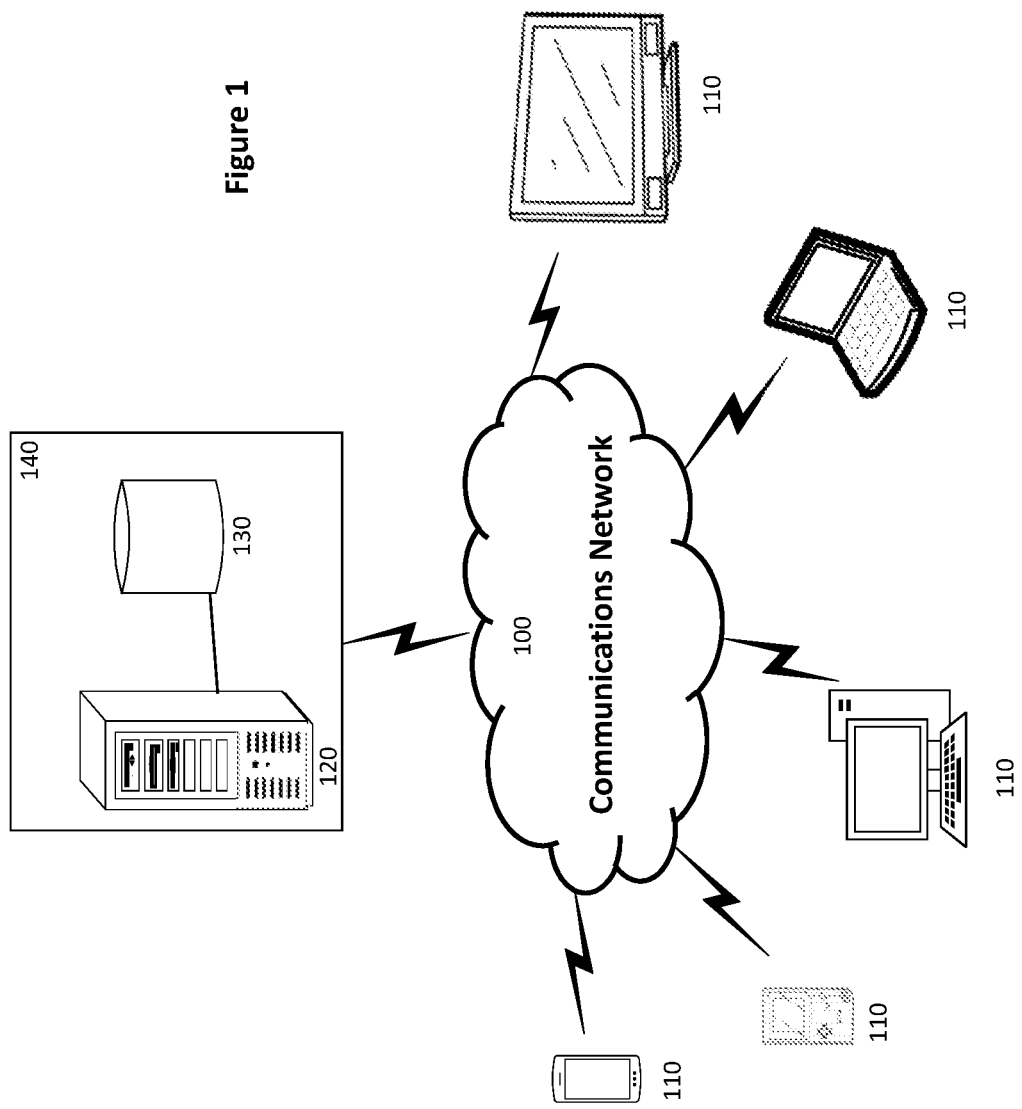
FIG. 1 is an example of a network scenario wherein embodiments herein may be employed.

FIG. 1 illustrates a network scenario wherein embodiments herein may be employed. As shown, the network scenario comprises communication devices 110 which may include a smartphone, a portable media/game player, a PC or MAC, a laptop computer, a LCD or smart TV, a gaming device, etc., which can communicate with a service provider 140 through a communications network 100 of an operator. Hereinafter, a communication device 110 is referred to as a User Equipment (UE). The service provider 140 may include a server 120 and a database 130. The communications network 100 may be a Local Area Network (LAN), a Wireless LAN, a Wide Area Network (WAN), a 3G, 4G, 5G network, Internet, a satellite communication network, etc. The users may use input devices such as hand controllers, headsets etc., to control the selected services.

In the context of the embodiments herein, the server 120 may belong to a service provider of cloud gaming. The database 130 may be used by the service provider 140 to store user accounts which may include IP addresses, user account identity, MSISDN (Mobile Subscriber ISDN Number), etc. The network operator of the communications network 100 may include radio base stations, Access Points or the like to communicate wirelessly with the UEs 110. The operator may also provide some of UEs with wired connections, e.g., via Ethernet connections. Hence, the network of the operator may support any of radio access technologies including 2G, 3G, 4G, 5G, WiFi or WLAN, Wimax, in addition to wired networks such as ADSL, fiber or a combination thereof.

Figure 2:
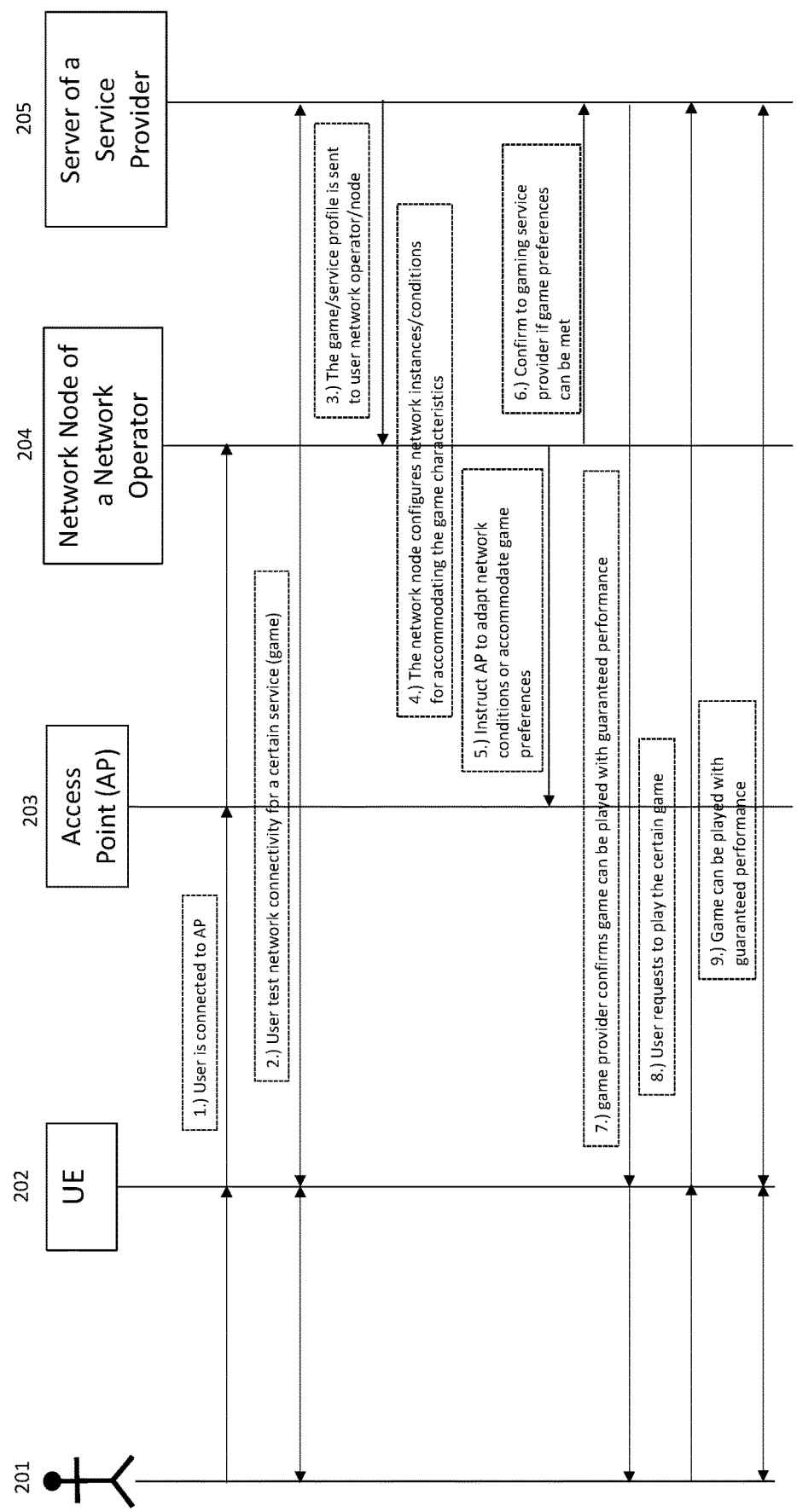
FIG. 2 is an exemplary diagram illustrating request and delivery of a service according to some embodiments herein.

Referring to FIG. 2, there is illustrated an exemplary scenario of a method according to some embodiments herein. In this example, the user 201 of UE 202 wishes to play an on-demand application (e.g., game) provided by the service provider or server 205 of a cloud environment, via a network operator or a network node 204 of an operator. It is here assumed that the UE 202 can access the Internet via an Access Point 203 that may be available at the premises of the user 201 or at the network of the operator 204. UE 202 may be any of the UEs 110 shown in FIG. 1.

As shown, in step 1, the UE 202 of the user 201 is connected to the AP 203. The user 201 wishes to play an online game provided by the server 205 of the service provider. Before, the game or service can be played, network connectivity is tested for the selected game or service (step 2). This may be performed using a built-in application provided by the service provider hosting the cloud game. Such an application can be lunched by the user 201, e.g., by starting the application residing in the UE 202 of the user.

According to embodiments of the present invention, the service provider or server 205 is configured to send (step 3), to the network node 204 of the network operator, a service profile for the game selected by the user 201 of UE 202. As mentioned earlier, the UE 202 may be identified with an IP-address, a user account id., MSISDN etc., that may be stored in a user account at a database of the service provider. An example of a service profile may include information on at least the bandwidth or the throughput, latency and the number of frames per second, required for the selected game.

Table 1 below illustrates examples of service profiles per game. The service profile may be verified by the service provider.

As an example, assume that the user has selected a game entitled "Half life" having game "Game Id=5df6gfgd", "Category=Action". The service profile for this game may be:

Service Profile: [Minimum Bandwidth=50 Mbps; Max/Optimal Bandwidth=75 Mbps; Max Latency=35 ms; Minimum FPS=60 fps].

The service profile thus includes information on the required characteristics of the game that guarantee the desired gaming experience for the user.

TABLE 1

Different service profiles for different games

| Game Title | Game Id | Category | Min Bandwidth | max/optimal Bandwidth | Max Latency | Minimum FPS |
|---|---|---|---|---|---|---|
| Half life | 5df6gfgd | Action | 50 Mbps | 75 Mbps | 35 ms | 60 fps |
| Resident Evil 7 | 646322bv | Adventure | 40 Mbps | 60 Mbps | 60 ms | 55 fps |
| NBA 2K18 | 997543hji | Sport | 25 Mbps | 45 Mbps | 50 ms | 50 fps |
| Dirt 4 | 339jfwwy | Racing | 30 Mbps | 60 Mbps | 30 ms | 60 fps |
| Dota 2 | 87964jfjfw | Strategy | 20 Mbps | 35 Mbps | 50 ms | 45 fps |
| PRO evolution Soccer 2018 | 98953jfws | Sports | 25 Mbps | 35 Mbps | 45 ms | 50 fps |
| PUBG | 353699jjr | Action | 35 Mbps | 70 Mbps | 30 ms | 55 fps |

When the network node 204 of the network operator receives the service profile, the network node 204 configures network conditions (step 4), in terms of at least bandwidth or throughput, and latency, based on the received service profile. In other words, the network operator may build an "on-demand" configuration of the network conditions/instances that accommodates the game preferences or fulfils the characteristics or requirements of the selected game. It should be mentioned that games may be categorized in blocks where several games belong the same profile. As an example, the games that have the same characteristics in terms of bandwidth, latency and fps may have the same service profile.

According to an embodiment herein, the network node 204 of the network operator sends a request to a AP 203 selected by the network node 204 requesting/instructing the AP 203 to adapt its network conditions (or accommodate game preferences) in accordance with the configured network conditions (step 5). The network operator may configure the AP 203 or the UE 202, provided the operator 204 has authority to do so.

The service profile information received from the server 205 of the service provider may also be used by the network operator to calculate, by means of an algorithm, the network path and instances that support the establishment of the real-time "virtual" connection necessary to provide sufficient quality of service.

In FIG. 2 only one AP 203 is depicted and therefore the network operator 204 selects that AP. However, as will be described in conjunction with FIG. 3A and FIG. 3B, a plurality of APs are provided and the network node 204 makes the selection between those APs.

Referring back to FIG. 2, if the selected AP 203 successfully adapts its network conditions, the network node 204 of the network operator sends a confirmation to the server 205 of the service provider confirming that the requirements of the selected game in accordance with the service profile, are met (step 6).

The service provider 204 may then confirm to the user 201 of the UE 202 that the selected game can be played with guaranteed performance (step 7). The user then requests to play the selected game (step 8) whereby the game can be played (step 9).

Alternatively, and according to an embodiment, in step 8 above, the user may, in addition to requesting to play the selected game, also request to play the selected game for a desired amount of time (e.g., 2 hours), and informs the server 205 about this amount of time. The server 205 may then inform the network node 204 of how long the reservation of network resources should be made. The network node 204 may then inform a subscription database (not shown) of how long the subscription is valid and when to release the reserved resources. The subscription database may then store user subscribed game and validity of for how long the resources should be reserved in the network and when these resources should be released. Thereafter the game can be played with guaranteed performance and under the subscribed amount of time. An advantage with this embodiment is to make it easier to apply a charging model and related function to the selected service. As an example, the request to play a certain game may be ordered to be valid a certain amount of time (e.g., 3 hours), so network resources can be reserved during this time period and be automatically released on the expiration of this time period. This allows the network operator and/or the service provider to efficiently manage network resources. The user can be charged for the requested service for the reserved amount of time and resources.

As mentioned before, the embodiments of the present invention are applicable in fixed networks, mobile networks or a combination thereof. For fixed connections it is usually only one access available (e.g., via ADSL or fiber).

For mobile or cellular connections, it may be that there are several Radio Access Technologies (RATs) available, e.g. 3G, 4G, 5G, WiFi etc. The RAT that the user is connected with, typically due to logic in the UE or network, may not be the preferred one for guaranteeing a problem-free user experience of the game. Therefore, a user may be requested, by the network, to select an AP among a plurality of APs that fulfils the network conditions requirement by the service in accordance with the service profile for the selected game. The AP may be an Integrated Access Device (IAD), a Residential Gateway (RG), a mobile device gateway or the like.

Figure 3A:
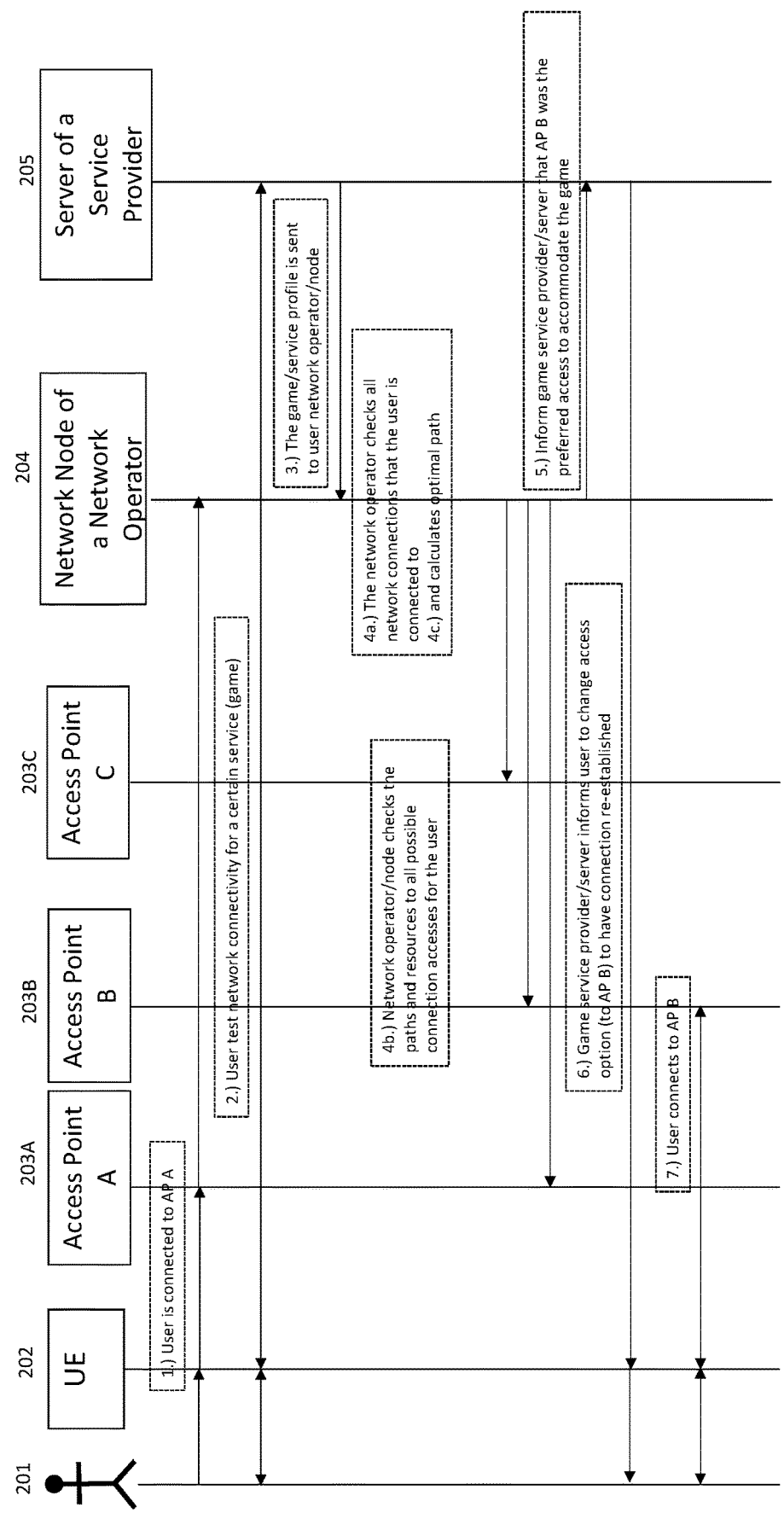
FIGS. 3A-3B are other exemplary diagrams illustrating request and delivery of a service according to some embodiments herein.

FIG. 3A illustrates such a scenario. Similar to FIG. 2, in step 1, the UE 202 of the user 201 is connected to an access point (AP) A 203A. As shown, there are 2 additional Aps, namely AP B 203B and AP C 203C. AP A 203A may be the default AP or is manually selected by the user 201 of UE 202. The user 201 wishes to play an online game provided by the service provider. Before, the game can be played, network connectivity is tested for the selected game (step 2). This may be performed using a built-in application provided by the service provider hosting the cloud game.

The service provider or server 205 is configured to send (step 3), to the network node 204 of the network operator, a service profile of the game selected by the user 201 of UE 202. As mentioned earlier, the UE 202 may be identified with an IP-address, a user account id., MSISDN etc. that may be stored in a user account at a database (not shown) of the service provider and/or a database (not shown) of the network operator. An example of a service profile has already been described.

According to an embodiment, the network node 204 is configured to check whether the UE 202 has a plurality of available access points to connect to. As an example, the network node 204 may look into a user database for retrieving information on available access points for the user. The network node 204 may determine and/or request network conditions from each of said available access points in order to calculate an optimal path/connection needed for the provision of the selected game. As an example, the network node 204 of the operator may ping the different APs 203A, 203B and 203C, to retrieve network conditions and resources that each of these APs can offer for the selected game in order to select the most appropriate AP for the provision of the selected game (steps 4a, 4b, 4c). The network node 204 of the network operator then informs the server 205 of the selected AP. As an example, assume that AP B 203B is selected by the network node 204, although the UE 202 is connected to AP A 203A. The network node 204 informs the server 205 (step 5) that another AP (AP B 203B) is to be used for providing the selected game to the user 201 since AP B 203B either successfully adapts its network conditions in accordance with the service profile, or that the network conditions of this AP, AP B 203B already fulfill the requirements of the service profile. As an example, AP A 203A may be a 3G AP and therefore, the network conditions for playing the on-demand game may not have been fulfilled. The network node 204 selects AP B 203B (it could be a 4G AP or a 5G AP) because it determined that the network conditions of this AP fulfils the requirements of the service profile.

Since UE 202 is connected to AP A 203A, the server 205 of service provider then informs/requests the user 201 of UE 202 to change access option to AP B 203B to have the connection re-established (step 6). The user 201 of UE 202 then connects to AP B 203B (step 7).

Figure 3B:
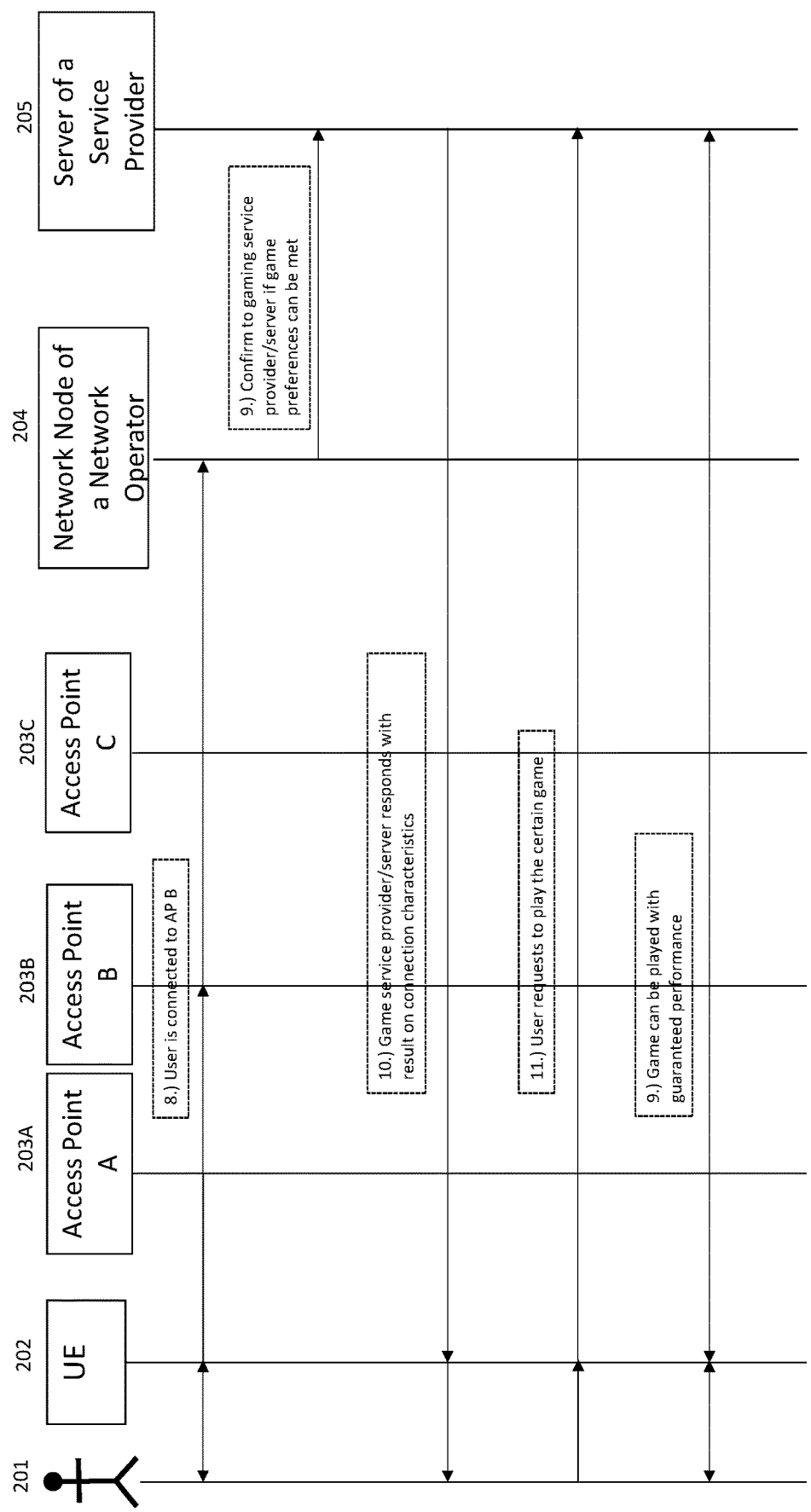

FIG. 3B depicts the remaining steps following step 7 of FIG. 3A.

After establishment of the connection to AP B 203B (step 8), the network node 204 of the operator sends a confirmation to the server 205 of the service provider confirming that the requirements of the selected game in accordance with the service profile, are met (step 9). The server 205 responds with result on connection characteristics to the user 201 that the selected service or game can be played (step 10). The user 201 then requests, by means of UE 202, to play the selected game (step 11) and the game can now be played with guaranteed performance over the configured path in the network of the network operator.

Alternatively, and as previously described, the user may, in addition to requesting to play the selected game (in step 11), also request to play the selected game for a desired amount of time (e.g., 2 hours), and informs the server 205 about this amount of time. The server 205 may then inform the network node 204 of how long the reservation of network resources should be made. The network node 204 may then inform a subscription database (not shown) of how long the subscription is valid and when to release the reserved resources. The subscription database may then store a user subscribed game and validate for how long the resources should be reserved in the network, and when these resources should be released. Thereafter the game can be played with guaranteed performance and under the subscribed amount of time.

Figure 4:
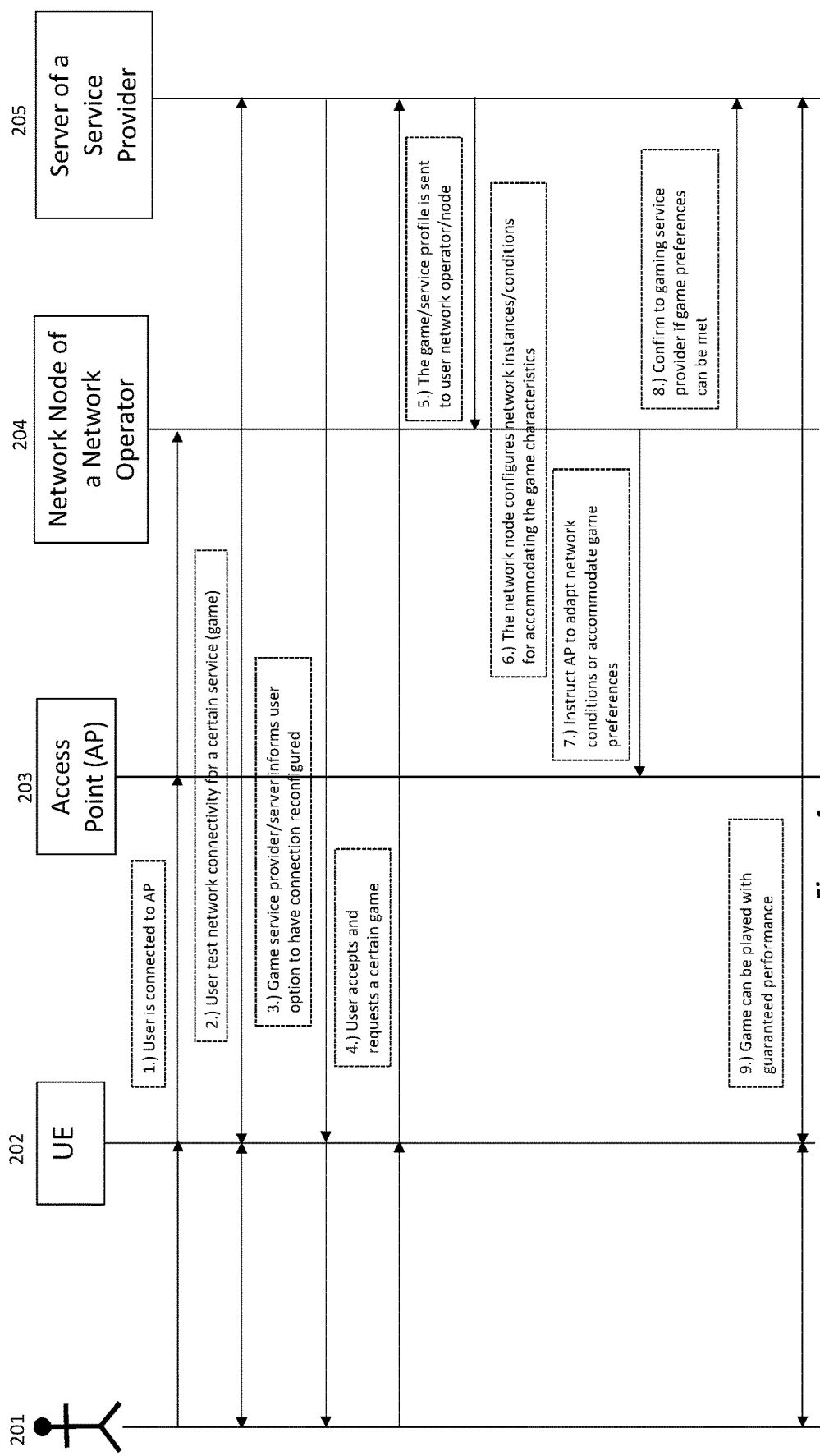
FIG. 4 is another exemplary diagram illustrating request and delivery of a service according to some embodiments herein.

FIG. 4 illustrates yet another scenario according to an embodiment herein. In this case, there is one AP 203 as in the case in FIG. 2. In step 1, the user 201, by means of UE 202, wishes to play an online game provided by the service provider and connects to AP 203. Before the game can be played, network connectivity is tested for the selected game (step 2). This may be performed using a built-in application provided by the service provider 205 hosting the cloud game, as previously described. However, in this scenario, the network connectivity for playing the game fails due to, e.g., the demands of the game cannot be fulfilled. The server 205 informs the user 201 of UE 202 of this failure and provides an option to have the connection reconfigured (step 3). The user 201 accepts and sends a request to the service provider to play a certain game (step 4).

As in the previously described embodiment, the user may, in addition to requesting to play the selected game (in step 4), also request to play the selected game for a desired amount of time (e.g., 2 hours), and informs the server 205 about this amount of time.

Similarly to some steps of FIG. 2, the server 205 sends the service profile to the network node 204 (step 5). When the network node 204 of the network operator receives the service profile, the network node 204 configures network conditions (step 6), in terms of at least bandwidth or throughput, and latency, based on the received service profile. In other words, the network operator may build an "on-demand" configuration of the network conditions that accommodates or fulfils the characteristics or requirements of the selected game.

The network node 204 then sends a request/instruction to AP 203 requesting the AP to adapt its network conditions in accordance with the configured network conditions (step 7). The network operator 204 may configure the (selected) AP 203 or the UE 202, provided the operator 204 has authority to do so. If the AP 203 successfully adapts its network conditions, the network node 204 sends a confirmation (step 8) to the server 205 confirming that the requirements of the selected game in accordance with the service profile, are met.

The server 204 may then confirm to the user 201 of the UE 202 that the selected game can be played with guaranteed performance (not shown). The user then plays the requested game (step 9).

Figure 5:
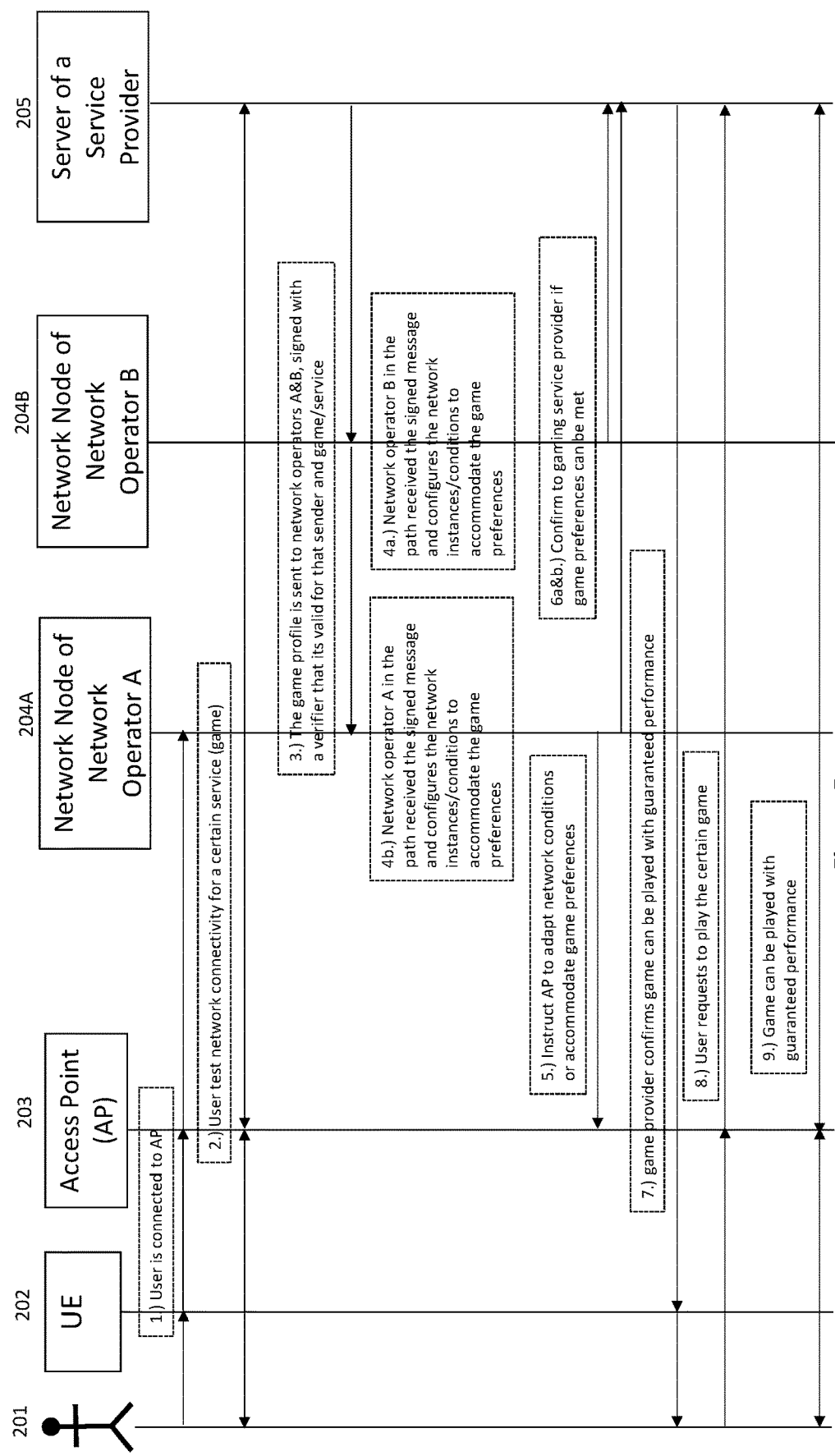
FIG. 5 is another exemplary diagram illustrating request and delivery of a service according to some embodiments herein.

FIG. 5 illustrates yet another scenario, but in this case multiple network operators are involved in the path between the end user and the service provider. Hence, a single operator is not in full control of the path between the user and the service provider.

Steps 1-2 are similar to those previously presented. Only one AP 203 is shown, although the present embodiment is not restricted to only one AP. In step 3, the server 205 of the service provider transmits the service profile, for the service (or game) selected by the user 201 of UE 202, to both network operator A 204A and network operator B 204B.

However, in this scenario, and according to an embodiment herein, the server 205 of the service provider is configured to send the service profile signed with a verifier. As an example, the server 205 sends a message that includes the service profile and this message is digitally signed with a verifier to ascertain the truth or correctness or validity of the selected service and the sender (i.e., the service provider). Upon receiving the signed message including the service profile, the network nodes 204A of network operator A matches it towards a database (not shown) including signatures. The network nodes 204B of network operator B also matches it towards a database (not shown) including signatures.

The network operators A and/or B may have an agreement with the service provider agreeing that the service profiles should be accepted when signed messages are received and processed. This would enable dynamic support of the requested service (e.g., game) throughout the network, i.e., even if several network operators are present in the path between the service provider and the end-user. In such a case, routing (re-routing) may occur while the service is being consumed by the user.

The signed messages received by the network nodes of the network operators A and B may be seen as a trigger to operators down the path of an end-to-end path that they should activate categorization and prioritization in their network nodes or equipments to fully support the requested service.

So, in steps 4*a* and 4*b*, the network nodes 204A and 204B may configure network conditions, in terms of at least bandwidth or throughput and latency, based on the received signed service profile. If network operator A of network node 204A has control of the connection point, the network node 204A requests or instructs AP 203 to adapt its network conditions in accordance with the configured network conditions, i.e., the AP 203 is instructed to accommodate service preferences according to the service profile (step 5). If AP 203 successfully adapts its network conditions, network node 204A and network 204B send (step 6*a*&*b*) a confirmation to the server 205 confirming that the requirements of the service are met. The server 205 may then confirm to the user 201 of the UE 202 that the selected game can be played with guaranteed performance (step 7). The user 201 then requests to play the selected game (step 8) whereby the game can be played (step 9).

Alternatively, in step 8 above, the user may, in addition to requesting to play the selected game, also request to play the selected game for a desired amount of time (e.g., 2 hours), and informs the server 205 about this amount of time, as previously described. The server 205 may then inform the network node(s) 204A and 204B of how long the reservation of network resources should be made for. The network nodes 204A and 204B may then inform a subscription database (not shown) of how long the subscription is valid and when to release the reserved resources. The subscription database may then store the user subscribed game and validate for how long the resources should be reserved in the network and when these resources should be released. Thereafter, the game can be played with guaranteed performance and under the subscribed amount of time. An advantage with this embodiment is to make it easier to apply a charging model and related function to the selected service. As an example, the request to play a certain game may be ordered to be valid a certain amount of time (e.g., 3 hours), so network resources can be reserved during this time period and be automatically released on expiration of this time period. This allows the network operators and/or the service provider to efficiently manage network resources. The user can be charged for the requested service for the reserved amount of time and resources.

With the embodiments of the present invention, the requirements of a selected service are met by adopting network conditions, between the user and the service provider. This leads to an improvement in user perceived experience while consuming the selected service.

Another advantage is that by introducing an information flow between a user—a service provider—network operator(s), the requested end user service can go from being best effort to on-demand access agnostic and network supported.

A further advantage is to enable the network operator, with a high level of certainty, to inform the service provider whether or not the specific characteristics for a specific service or game can be met, and to take the necessary actions to guarantee that the service can be provided to the user.

Figure 6:
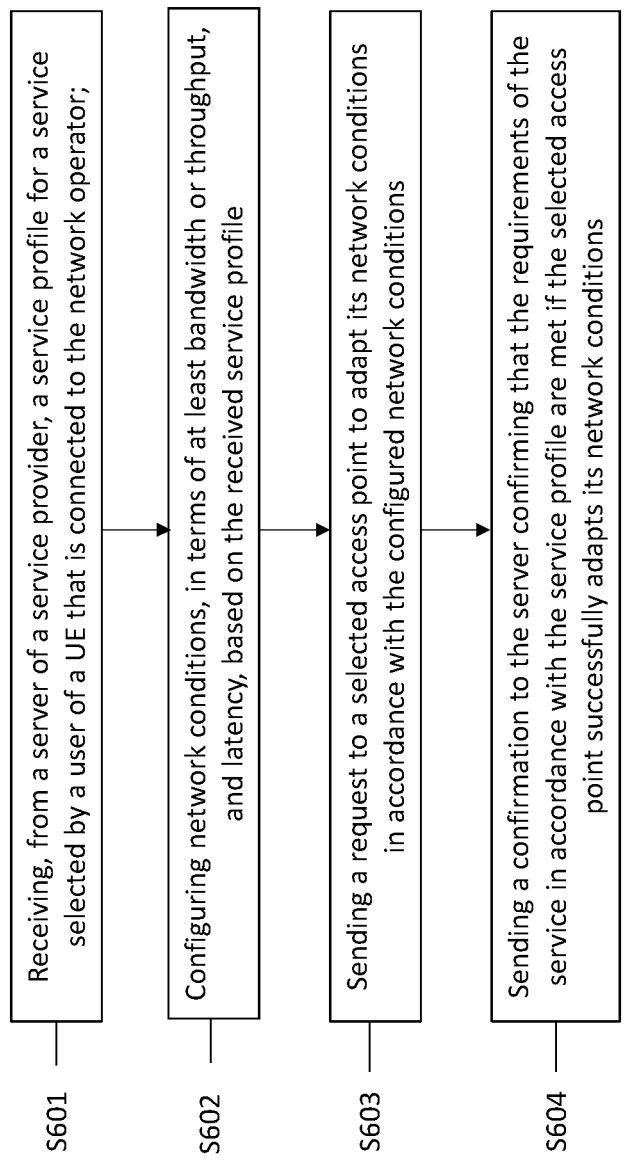
FIG. 6 illustrates a flowchart of a method performed by a network node according to embodiments herein.

FIG. 6 illustrates the main steps of a method performed by a network node 204 of the network operator according to some embodiments herein. The method comprises:

(S601) receiving, from a server of a service provider, a service profile for a service selected by a user of a UE that is connected to the network operator;

(S602) configuring network conditions, in terms of at least bandwidth or throughput, and latency, based on the received service profile;

(S603) sending a request to an access point selected by the network operator, to adapt its network conditions in accordance with the configured network conditions; and (S604) if the selected access point successfully adapts its network conditions, sending a confirmation to the server of the service provider confirming that the requirements of the service in accordance with the service profile, are met.

It should be mentioned that the network node 204 may also inform the server 205 of a possible failure to meet the requirements of the service profile. In that case the network node may select and instruct another access point if several access points are available for the user.

According to an embodiment, the method may comprise checking whether the UE has a plurality of available access points to connect to and that being the case, determining/requesting network conditions from each of said access points; selecting an access point that fulfils the network conditions required by the service in accordance with the service profile; and informing the service provider of the selected access point.

Additional actions performed by the network node 204 of the operator have already been described and need not be repeated.

Figure 7:
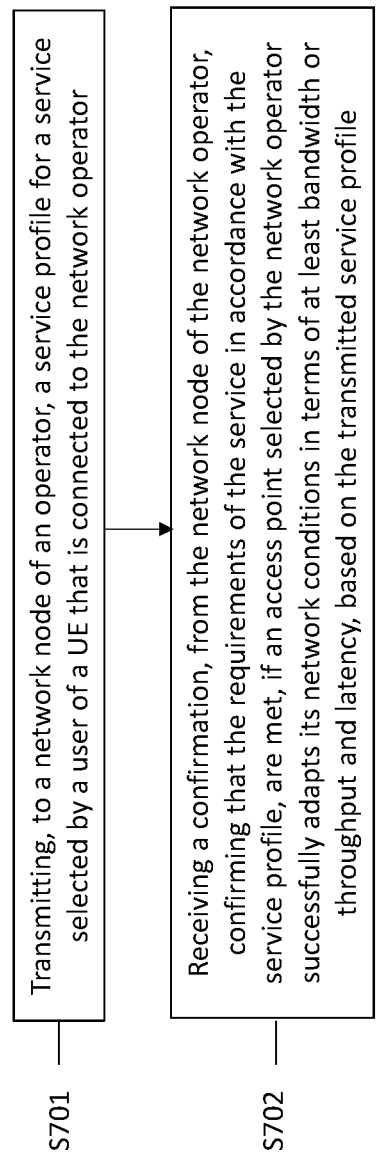
FIG. 7 illustrates a flowchart of a method performed by a server according to embodiments herein.

FIG. 7 illustrates the main steps of a method performed by a server 205 of a service provider according to some embodiments herein. The method comprises:

(S701) transmitting, to a network node of an operator, a service profile for a service selected by a user of a UE that is connected to the network operator;

(S702) receiving a confirmation, from the network node of the network operator, confirming that the requirements of the service in accordance with the service profile, are met, if an access point selected by the network operator successfully adapts its network conditions in terms of at least bandwidth or throughput and latency, based on the transmitted service profile.

Additional actions performed by the server 205 of the service provider have already been described and need not be repeated.

Figure 8:
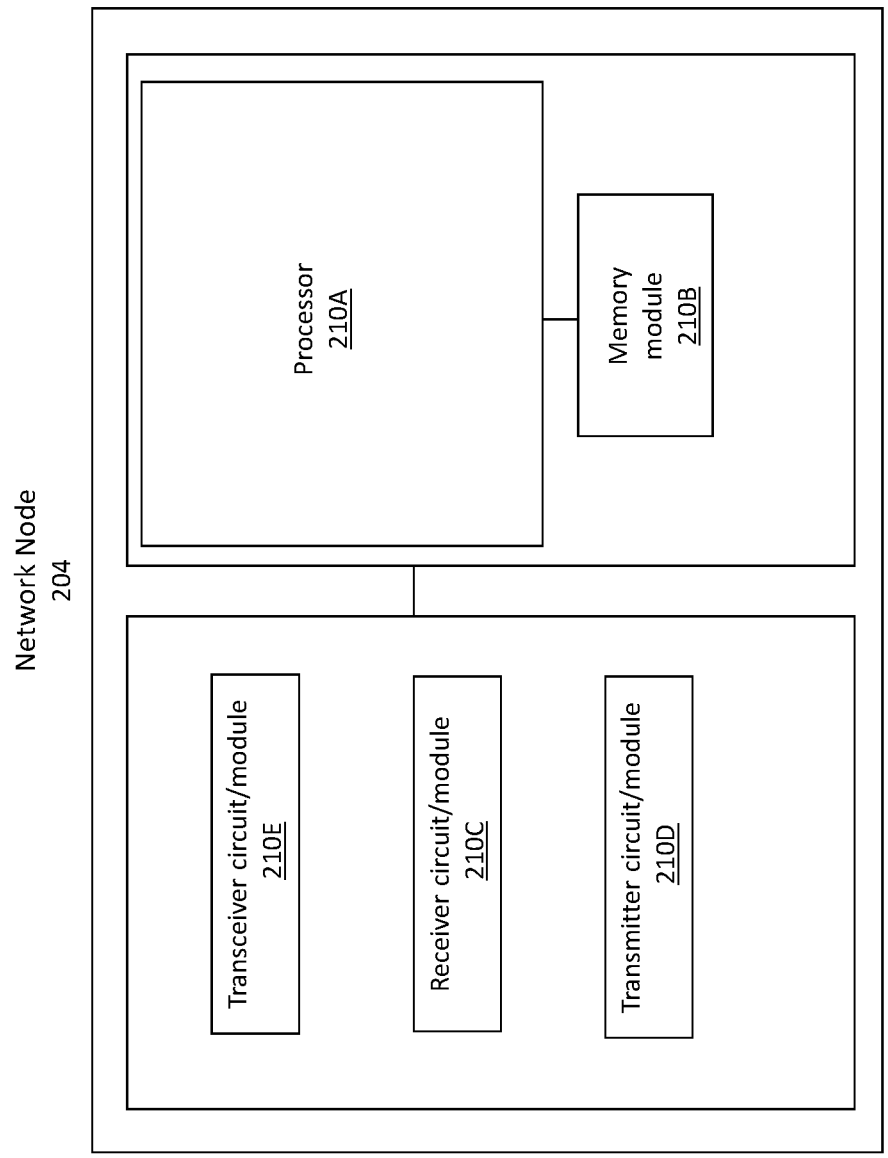
FIG. 8 illustrates an exemplary block diagram of a network node according to embodiments herein.

Referring to FIG. 8, there is illustrated an exemplary block diagram of a network node 204 of a network operator for performing the method steps and actions previously described. As shown, the network node 204 comprises a processing circuit or a processing module or a processor 210A; a memory module 210B; a receiver circuit or receiver module 210C; a transmitter circuit or transmitter module 210D; and a transceiver circuit or transceiver module 210E which may include the transmitter circuit 210D and the receiver circuit 210C. The network node 204 may support any of radio access technologies including 2G, 3G, 4G, 5G, WiFi, Wimax or a combination thereof for communicating with a UE and/or a service provider. The network node 204 may also provide fixed connections (ADSL or fiber). Hence the network node 204 may provide both wireless and fixed connections to users.

The processing module/circuit 210A includes a processor, microprocessor, an application specific integrated circuit (ASIC), field programmable gate array (FPGA), or the like, and may be referred to as the "processor 210A." The processor 210A controls the operation of the network node 204 and its components. Memory (circuit or module) 2108 includes a random access memory (RAM), a read only memory (ROM), and/or another type of memory to store instructions that may be used by processor 210A. The memory 210B may also store additional data (e.g. subscriber information, digital signatures etc.).

The processor 210A is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions stored in the memory specially adapts or configures the processor 210A to carry out the operations of the network node 204 disclosed herein.

The network node 204 is operative to: receive, from a service provider, a service profile for a service selected by a user of a UE that is connected to the network operator or to the network node 204; configure network conditions, in terms of at least bandwidth or throughput and latency, based on the received service profile; send a request to an access point selected by the network operator to adapt its network conditions in accordance with the configured network conditions; and if the selected access point successfully adapts its network conditions, the network node 204 is operative to send a confirmation to the service provider confirming that the requirements of the service in accordance with the service profile, are met.

Additional actions performed by the network node 204 have already been described and need not be repeated.

There is also provided a computer program comprising instructions which when executed on at least one processor 210A of the network node 204 according to embodiments herein, cause the at least one processor 210A to carry out the method previously described. Also a carrier containing the computer program is provided, wherein the carrier is one of a computer readable storage medium; an electronic signal, optical signal or a radio signal.

Figure 9:
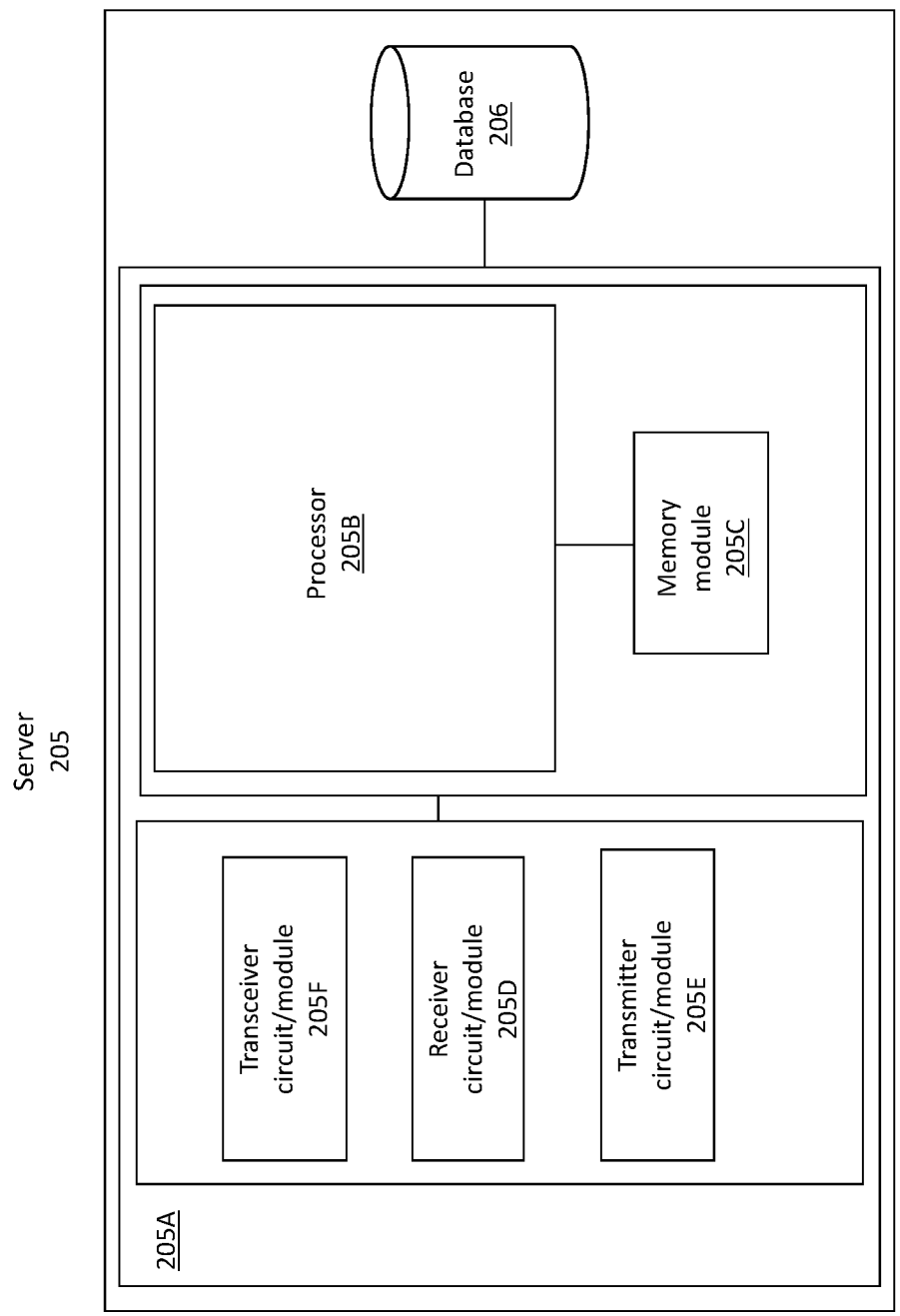
FIG. 9 illustrates an exemplary block diagram of a server according to embodiments herein.

Referring to FIG. 9, there is illustrated an exemplary block diagram of a server 205 of a service provider for performing the method steps and actions previously described. As shown, the server 205 may comprise a server part 205A and a database 206 which may be used to store information on users e.g., IP-addresses, user account ids, MSISDNs, etc. the database 206 may also store service profile as previously described. The server 205 further comprises a processing circuit or a processing module or a processor 205B; a memory module 205C; a receiver circuit or receiver module 205D; a transmitter circuit or transmitter module 205E; and a transceiver circuit or transceiver module 205F which may include the transmitter circuit 205E and the receiver circuit 205D. The server 205 may support any of radio access technologies including 2G, 3G, 4G, 5G, WiFi (or WLAN), Wimax or a combination thereof for communicating with a UE and/or a network operator. The server 205 may also provide fixed connections (ADSL or fiber). Hence the server 205 may provide both wireless and fixed connections to users via the Internet.

The server 205 may belong to a cloud network of the service provider which offers online cloud gaming, or music streaming, etc. The server 205 may be viewed as an application server of a cloud service provider.

The processing module/circuit 205B includes a processor, microprocessor, an application specific integrated circuit (ASIC), field programmable gate array (FPGA), or the like. The processor 205B controls the operation of the server 205 and its components. Memory (circuit or module) 205C includes a random access memory (RAM), a read only memory (ROM), and/or another type of memory to store instructions that may be used by processor. The memory 205C may also store additional data (e.g., subscriber information, digital signatures etc. service profiles, etc.).

The processor 205B is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions stored in the memory specially adapts or configures the processor 205B to carry out the operations of the server 205 disclosed herein.

The server 205 is operative to: transmit, to a network node of an operator, a service profile for a service selected by a user of a UE that is connected to the network operator. As an example, the network node of the operator may request the service profile from the server 205. The server 205 is further operative to receive a confirmation, from the network operator (or network node), confirming that the requirements of the service in accordance with the service profile, are met, if an access point selected by the network operator successfully adapts its network conditions in terms of at least bandwidth or throughput and latency, based on the transmitted service profile.

Additional actions performed by the server 205 have already been described and need not be repeated.

There is also provided a computer program comprising instructions which when executed on at least one processor 205B of the server 205 according to embodiments herein, cause the at least one processor 205B to carry out the method previously described. Also a carrier containing the computer program is provided, wherein the carrier is one of a computer readable storage medium; an electronic signal, optical signal or a radio signal.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation.

The invention claimed is:

1. A method, performed by a network node of a network operator, the method comprising:
   receiving, from a server of a service provider, a service profile for a cloud-based service selected by a user of a user equipment, UE, that is connected to the network operator;
   configuring network conditions, in terms of at least bandwidth or throughput, and latency, based on the received service profile;
   sending a request to an access point selected by the network operator to adapt its network conditions in accordance with the configured network conditions;
   if the selected access point successfully adapts its network conditions, sending a confirmation to the server of the service provider confirming that the requirements of the service in accordance with the service profile, are met;

checking whether the UE has a plurality of available access points to connect to;
at least one of determining and requesting network conditions from each of said access points;
selecting an access point that fulfils the network conditions required by the service in accordance with the service profile;
informing the server of the service provider of the selected access point and
should the selected access point differ from the access point that the UE is currently connected to,
requesting, via the server of the service provider, that the user of the UE change its access option from the access point that the UE is currently connected to, to the selected access point.

2. The method according to claim 1, wherein the service is an online gaming service and the service provider is a provider of cloud gaming.

3. The method according to claim 1, wherein the service profile received from the server of the service provider includes information on at least the bandwidth or the throughput; the latency, and a number of frames per second, fps, required for the selected service.

4. The method according to claim 3, wherein the received service profile is signed with a verifier.

5. A method, performed by a server of a service provider, the method comprising:
transmitting, to a network node of a network operator, a service profile for a cloud-based service selected by a user of a user equipment, UE, that is connected to the network operator;
receiving a confirmation, from the network operator or the network node, confirming that the requirements of the service in accordance with the service profile, are met, if an access point selected by the network operator or the network node successfully adapts its network conditions in terms of at least bandwidth or throughput, and latency, based on the transmitted service profile; and
should the network node select an access point that fulfils the network conditions required by the service in accordance with the service profile and should the selected access point differ from the access point that the UE is currently connected to,
receiving a notification from the network node to inform the user of the UE to change its access option from the access point that the UE is currently connected to, to the selected access point.

6. The method according to claim 5, wherein the service is an online gaming service and the service provider is a provider of cloud gaming.

7. The method according to claim 5, wherein the service profile includes information on at least the bandwidth or the throughput, the latency, and a number of frames per second, fps, required for the selected service.

8. The method according to claim 7, wherein the transmitted service profile is signed with a verifier.

9. The method according to claim 5, further comprising sending a confirmation to the UE confirming that the selected service can be consumed with guaranteed performance according to the service profile.

10. A network node of a network operator, the network node comprising a processor and a memory containing instructions executable by the processor, wherein the network node is operative to:

receive, from a server of a service provider, a service profile for a cloud-based service selected by a user of a user equipment, UE, that is connected to the network operator;
configure network conditions, in terms of at least bandwidth or throughput, and latency, based on the received service profile;
send a request to an access point selected by the network operator, to adapt its network conditions in accordance with the configured network conditions;
if the selected access point successfully adapts its network conditions, send a confirmation to the server of the service provider confirming that the requirements of the service in accordance with the service profile, are met;
check whether the UE has a plurality of available access points to connect to;
at least one of determine and request network conditions from each of said access points;
select an access point that fulfils the network conditions required by the service in accordance with the service profile;
inform the server of the service provider of the selected access point and
should the selected access point differ from the access point that the UE is currently connected to,
request, via the server of the service provider, that the user of the UE change its access option from the access point that the UE is currently connected to, to the selected access point.

11. The network node according to claim 10, wherein the service is an online gaming service and the service provider is a provider of cloud gaming.

12. The network node according to claim 10, wherein the service profile received from the server of the service provider includes information on at least the bandwidth or the throughput, the latency, and a number of frames per second, fps, required by the selected service.

13. The network node according to claim 12, wherein the received service profile is signed with a verifier.

14. A server of a service provider, comprising a processor and a memory containing instructions executable by the processor, wherein the server is operative to:
transmit, to a network node of a network operator, a service profile for a cloud-based service selected by a user of a user equipment, UE, that is connected to the network operator;
receive a confirmation, from the network node of the network operator, confirming that the requirements of the service in accordance with the service profile are met, if an access point selected by the network operator or by the network node successfully adapts its network conditions in terms of at least bandwidth or throughput, and latency, based on the transmitted service profile; and
should the network node select an access point that fulfils the network conditions required by the service in accordance with the service profile and should the selected access point differ from the access point that the UE is currently connected to,
receive instructions from the network node to inform the user of the UE to change its access option from the access point that the UE is currently connected to, to the selected access point.

15. The server according to claim 14, wherein the service is an online gaming service and the service provider is a provider of cloud gaming.

16. The server according to claim 14, wherein the service profile includes information on at least the bandwidth or the throughput, the latency, and a number of frames per second, fps, required by the selected service.

17. The server according to claim 16, wherein the transmitted service profile is signed with a verifier.

18. The server according to claim 14, further operative to send a confirmation to the UE confirming that the selected service can be consumed with guaranteed performance according to the service profile.

* * * * *